June 4, 1940.   L. IVERSEN   2,203,151
WELDING OF LENGTHS OF STRIP METAL
Filed June 23, 1938   12 Sheets-Sheet 1

INVENTOR
Lorenz Iversen

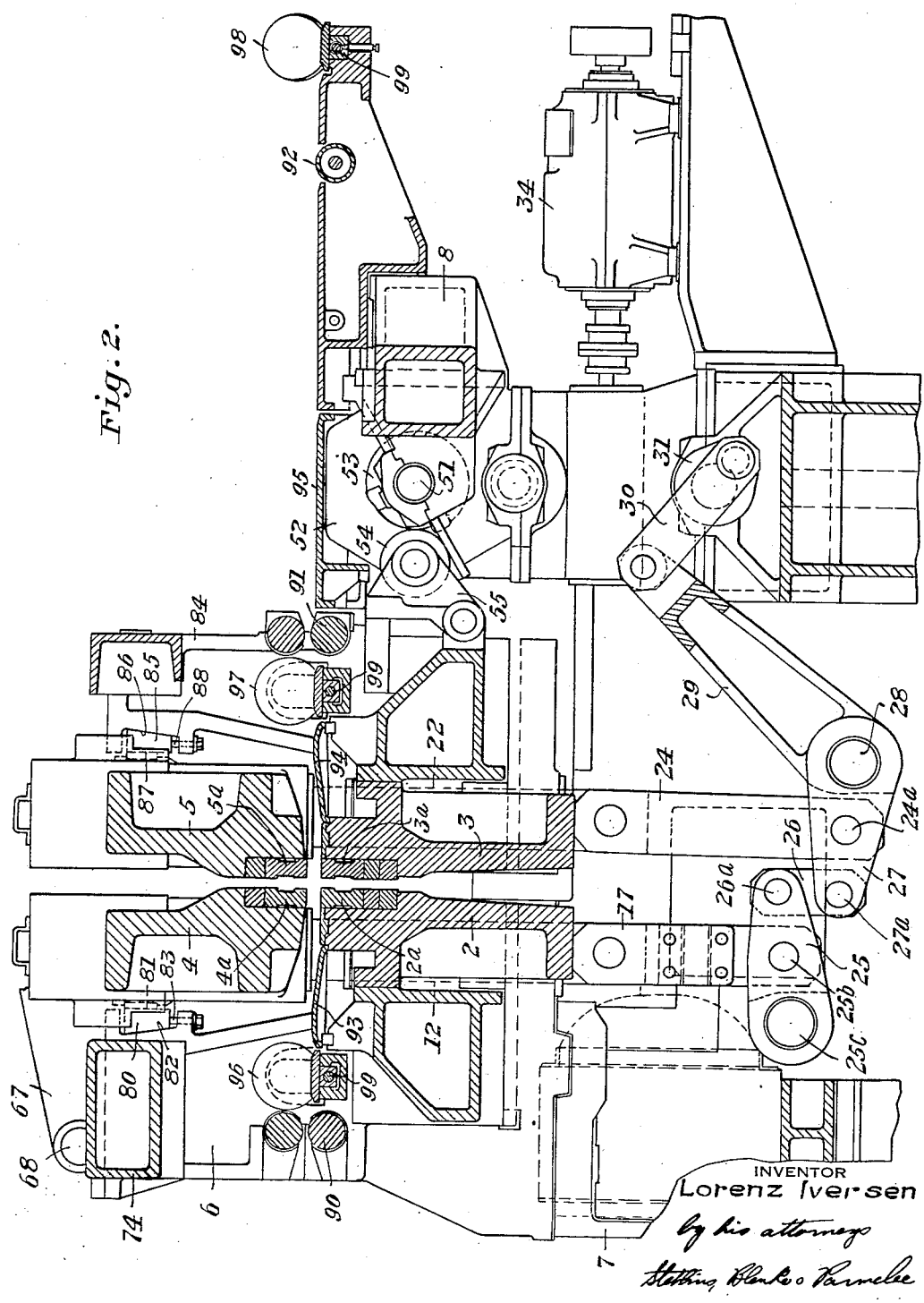

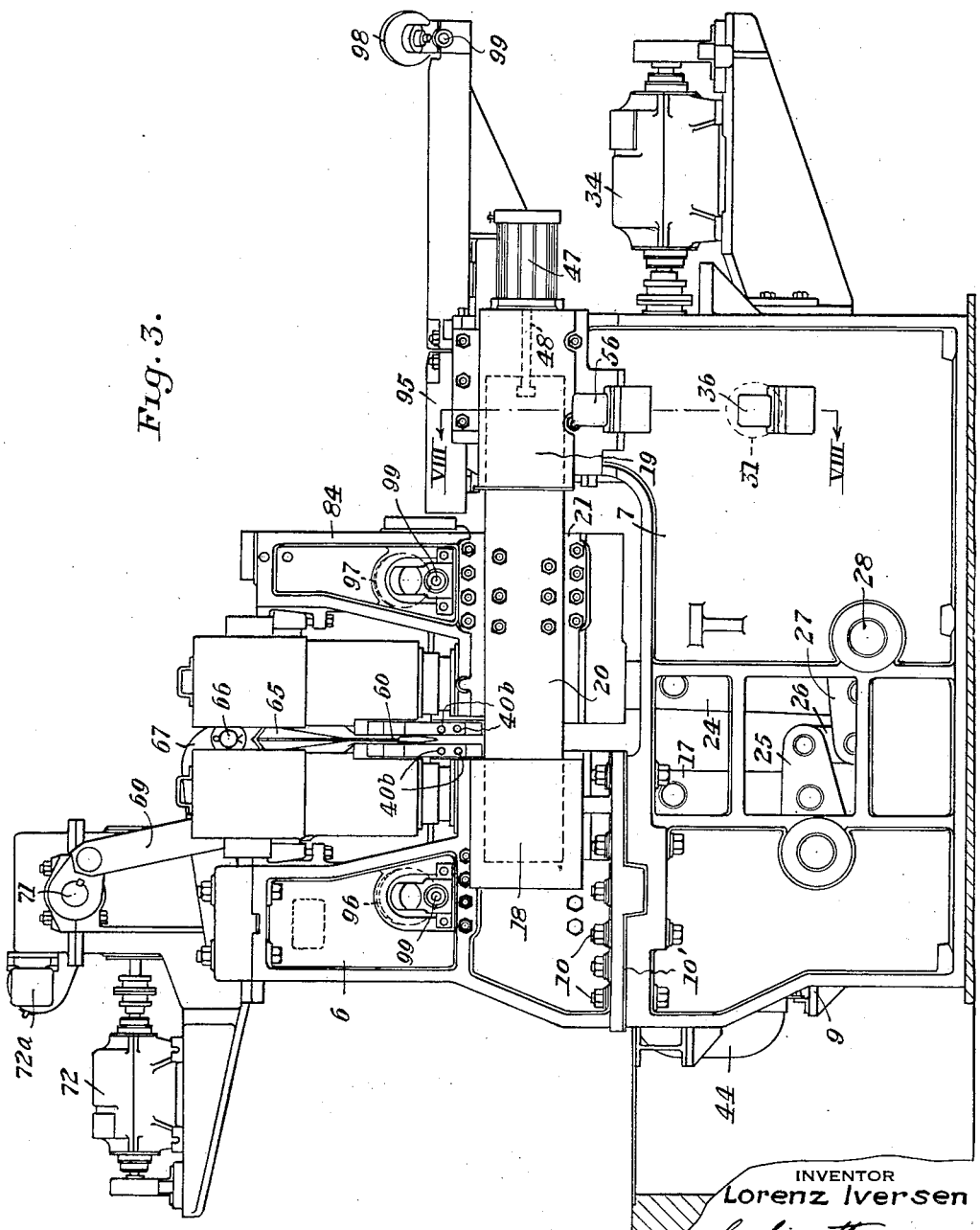

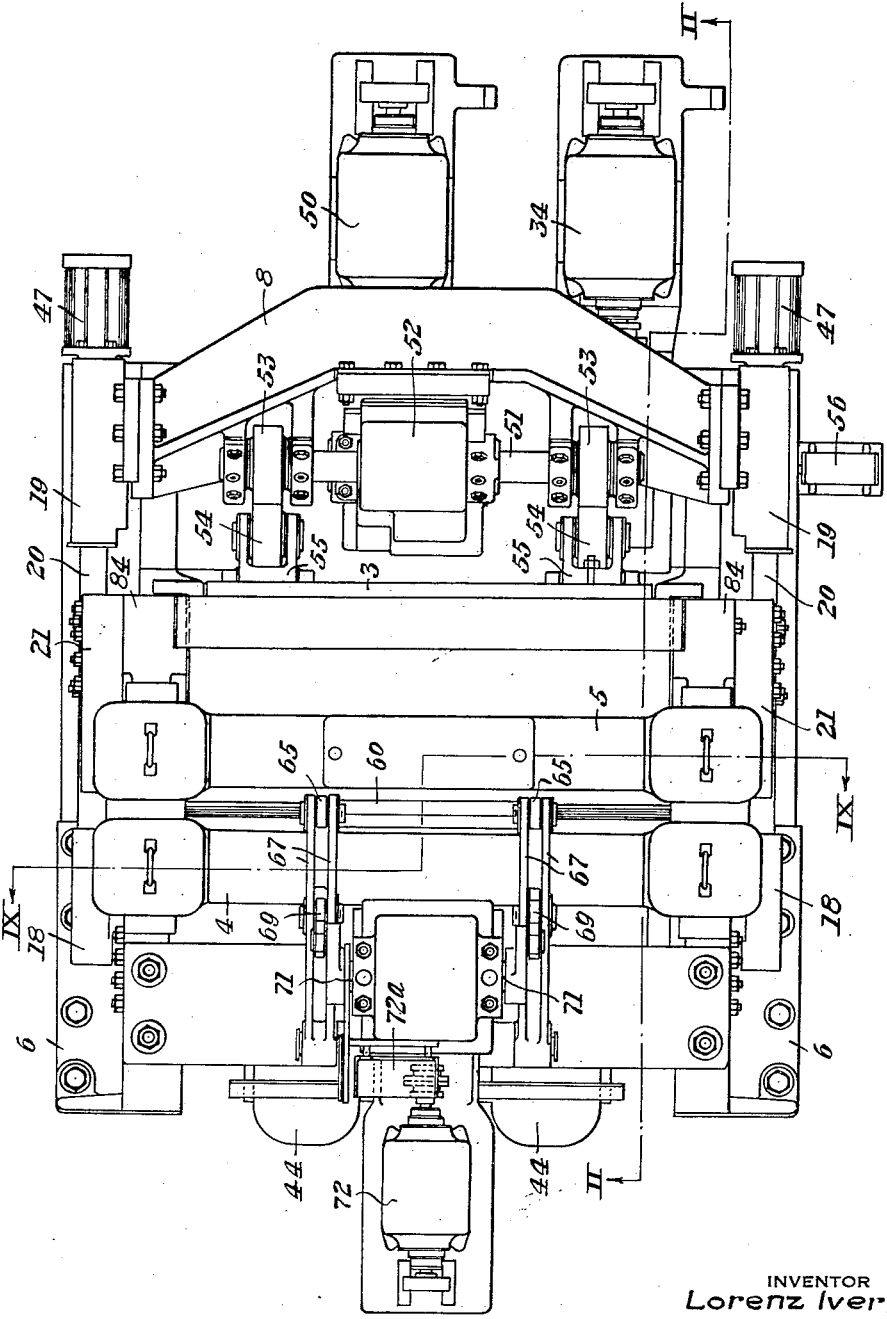

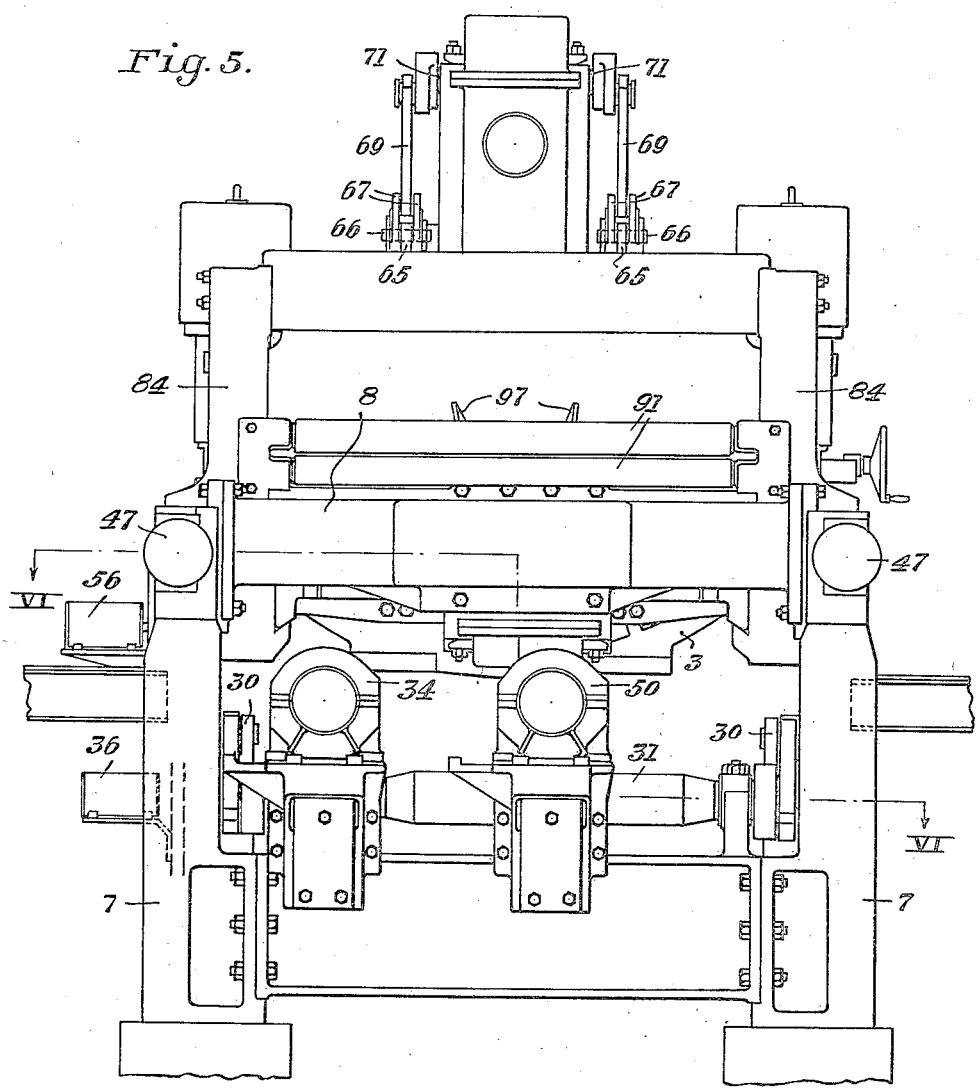

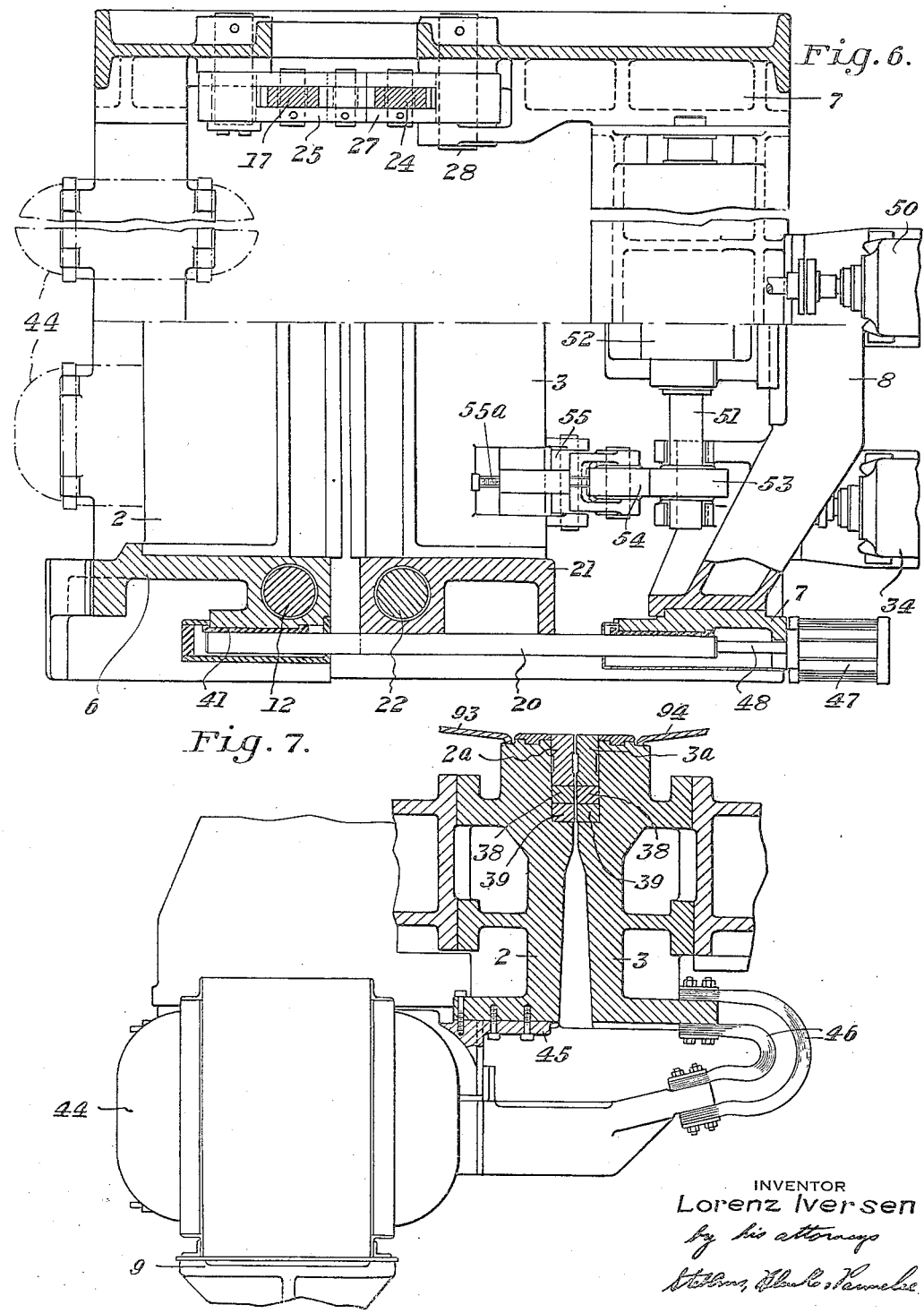

June 4, 1940.                     L. IVERSEN                    2,203,151
                        WELDING OF LENGTHS OF STRIP METAL
                    Filed June 23, 1938        12 Sheets-Sheet 7
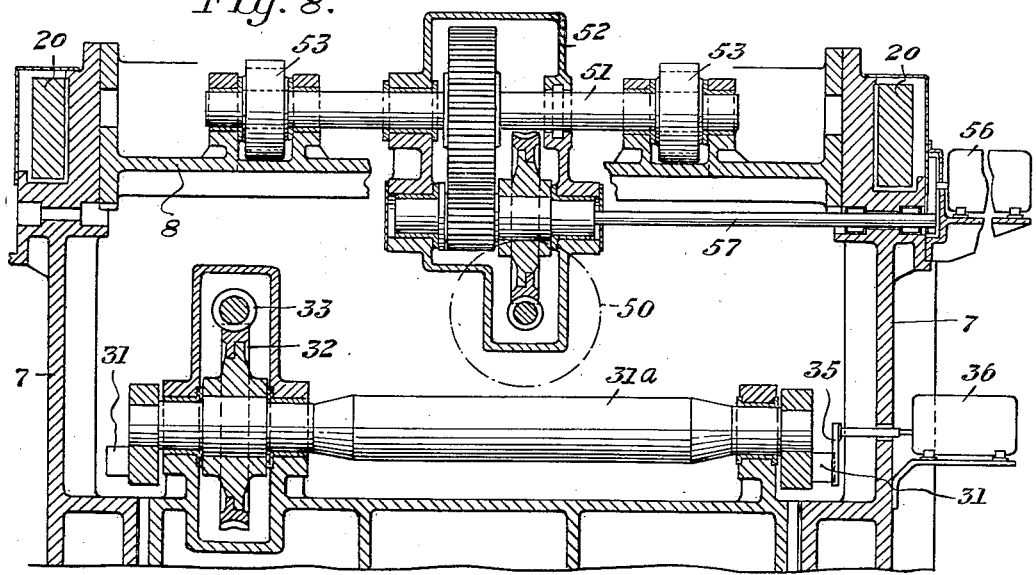
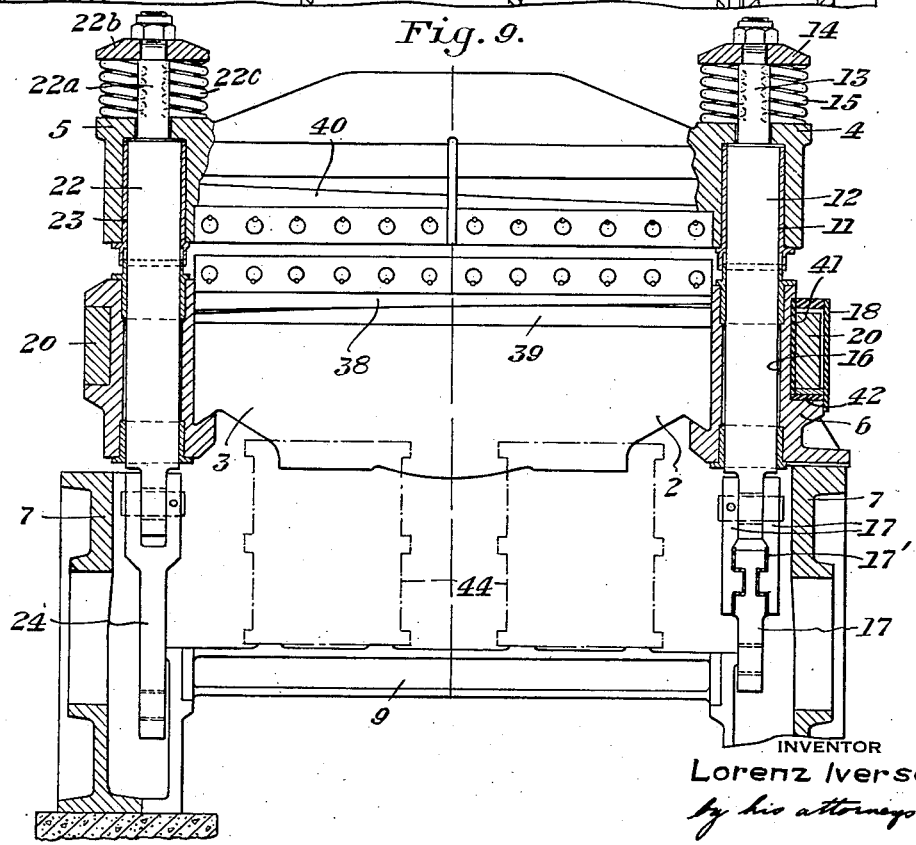
INVENTOR
Lorenz Iversen
by his attorneys

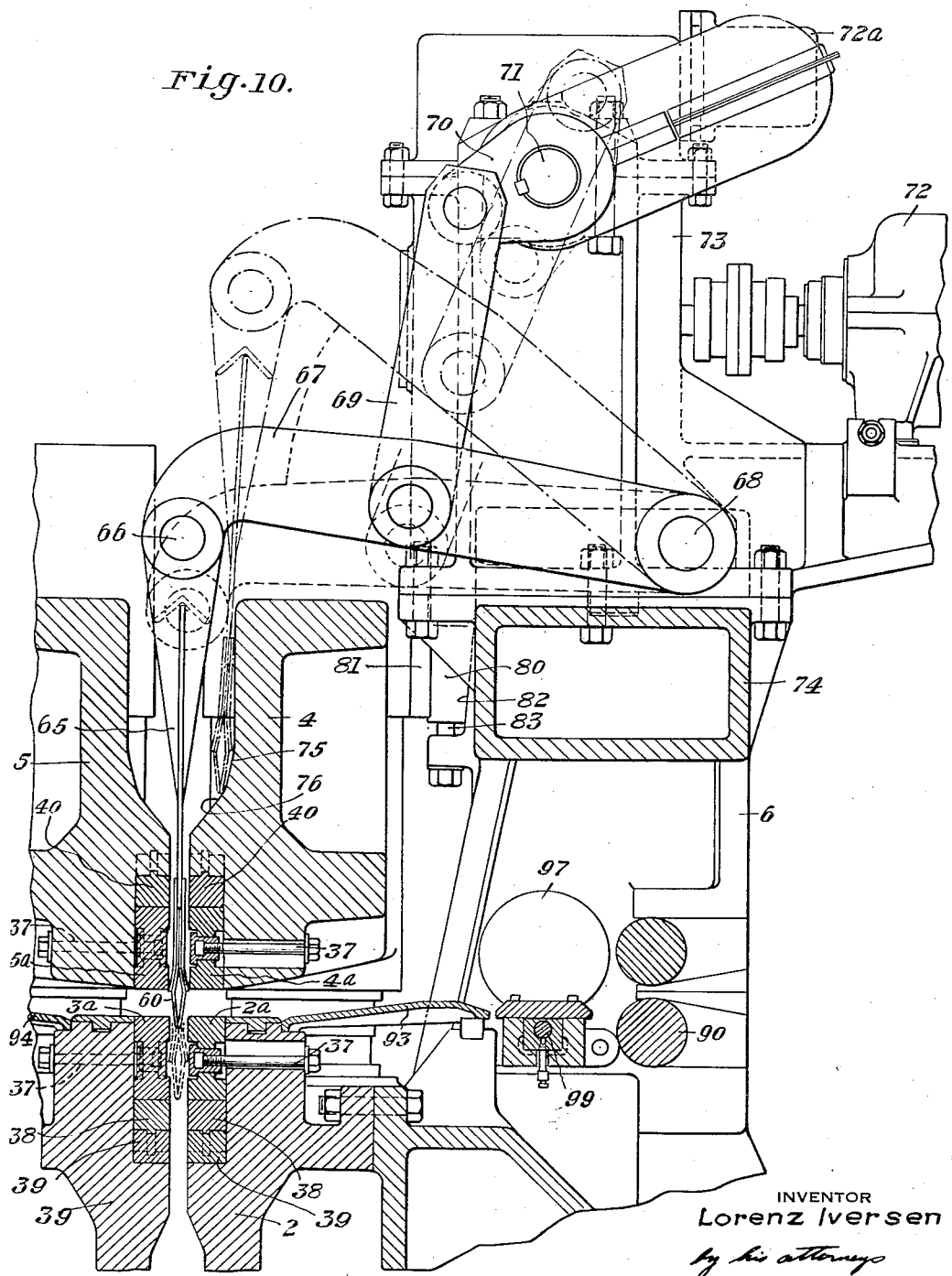

June 4, 1940.  L. IVERSEN  2,203,151

WELDING OF LENGTHS OF STRIP METAL

Filed June 23, 1938     12 Sheets-Sheet 9

INVENTOR
Lorenz Iversen

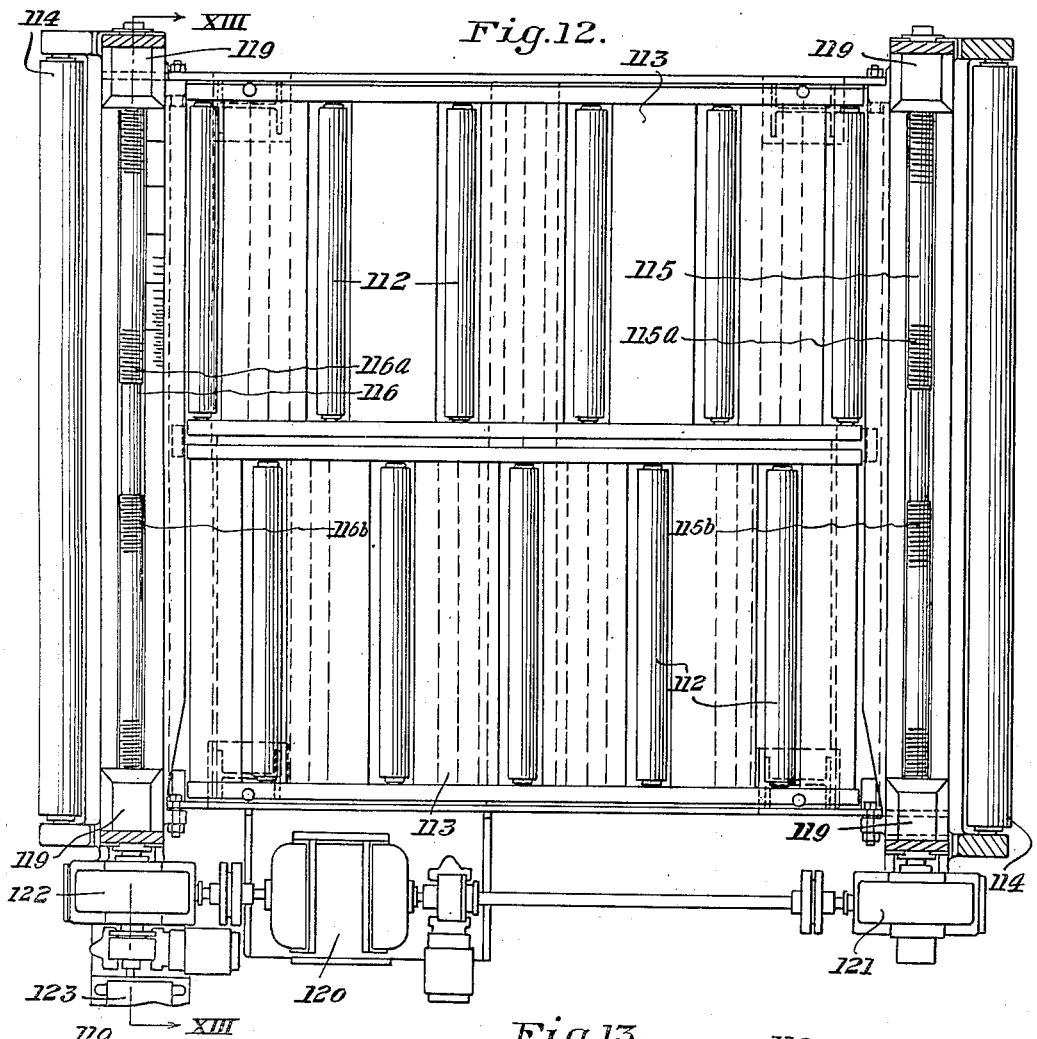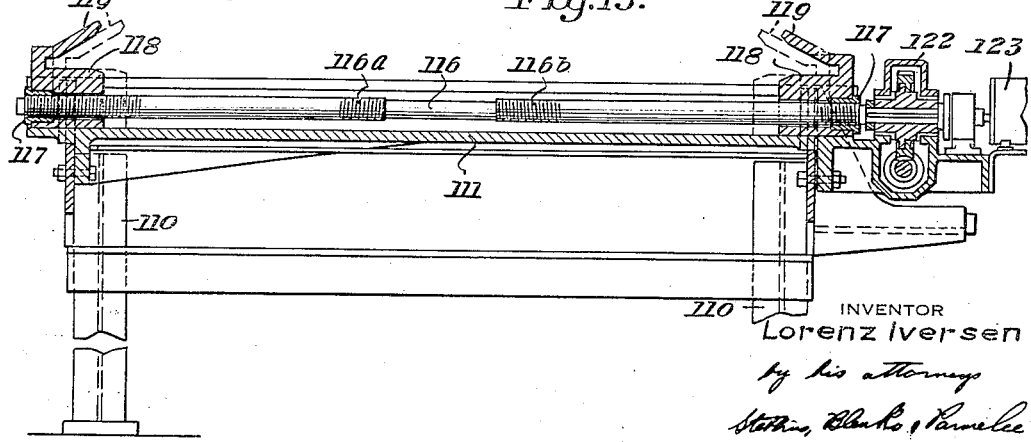

June 4, 1940.  L. IVERSEN  2,203,151
WELDING OF LENGTHS OF STRIP METAL
Filed June 23, 1938  12 Sheets-Sheet 11
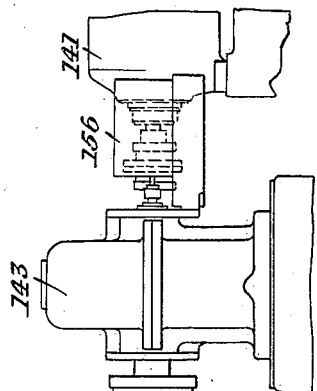
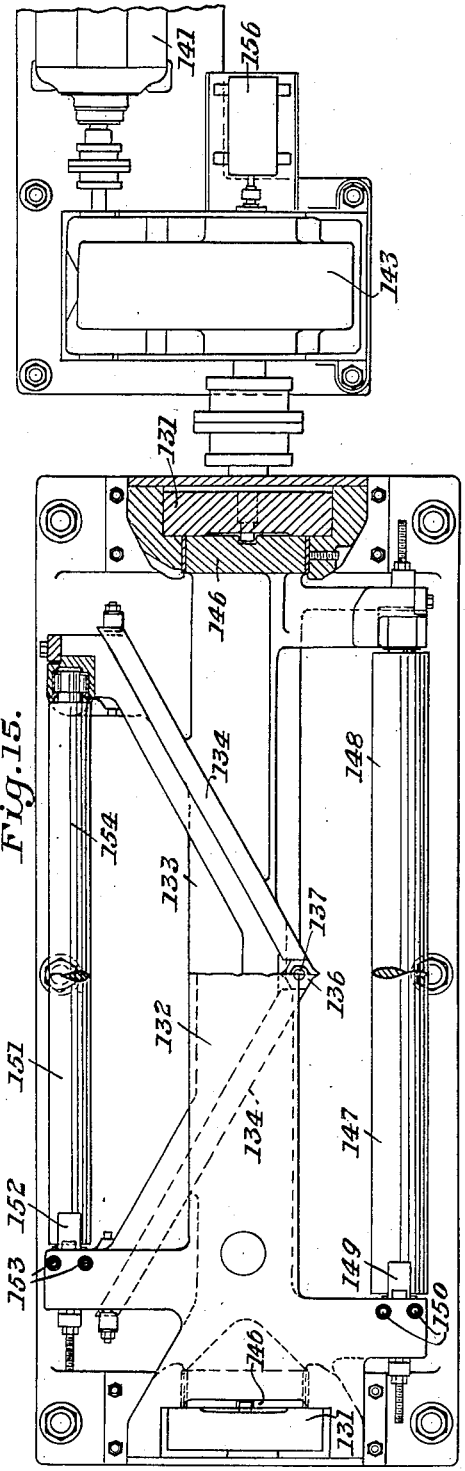
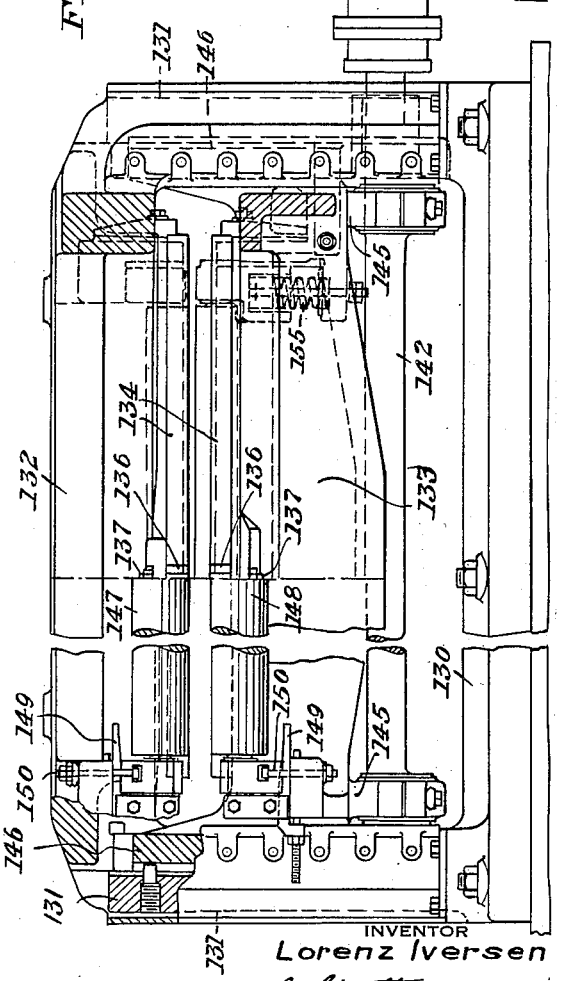
INVENTOR
Lorenz Iversen

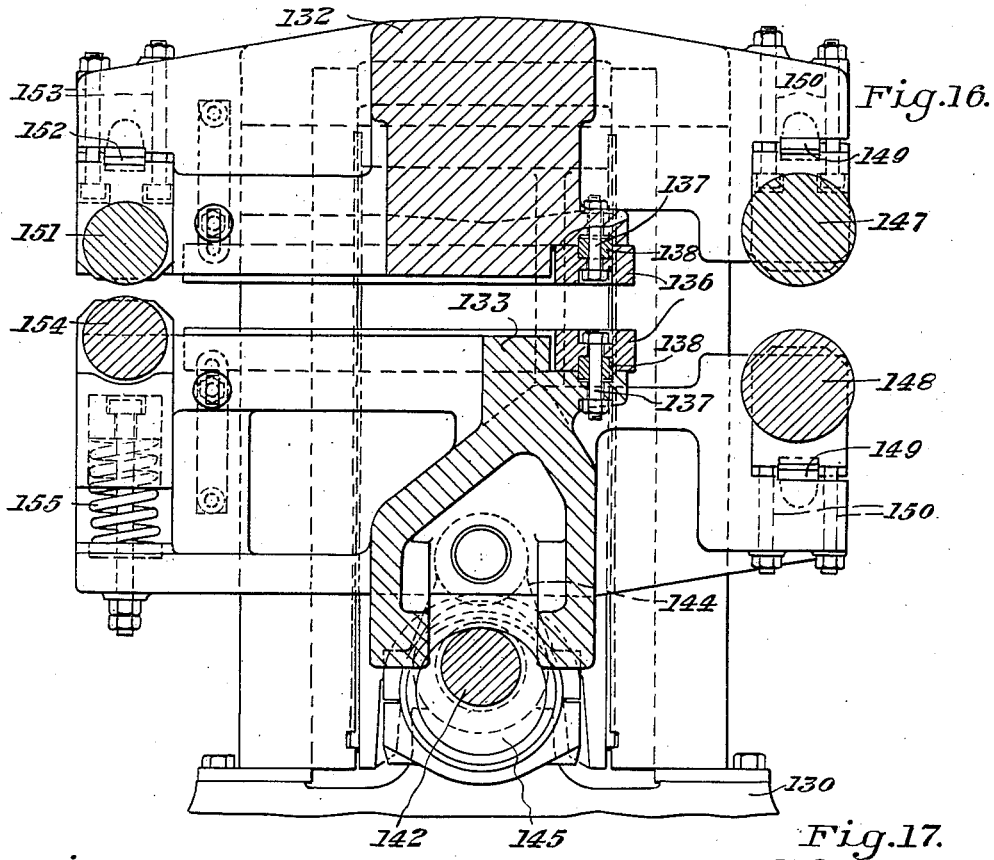

Patented June 4, 1940

2,203,151

UNITED STATES PATENT OFFICE 2,203,151

WELDING OF LENGTHS OF STRIP METAL

Lorenz Iversen, Pittsburgh, Pa., assignor to Mesta Machine Company, Pittsburgh, Pa., a corporation of Pennsylvania Application June 23, 1938, Serial No. 215,388

13 Claims. (Cl. 219—4).

This invention relates to the welding of lengths of strip metal to one another as, for example, the end-to-end welding of sheets or coils. It is frequently desirable in certain metal working operations, as, for example, cold rolling or continuous pickling, to operate on pieces of great length, greater than those available from ordinary methods of manufacture. Thus, it may be desirable to weld coils of hot rolled strip end-to-end to form larger coils for subsequent cold reduction or for continuous passage through a pickling unit. In other instances, it may be desirable to weld sheets end-to-end for other purposes.

The welding of relatively wide thin sheets of metal, particularly in succession, presents a number of difficulties which are overcome in the present invention.

In order to form a weld which may be passed through a cold rolling mill and which will reduce along with the body of the strip and withstand the tension under which the metal is rolled, it is required that the weld portion of the strip shall not be materially thicker than the body of the strip, and furthermore, the metal in the weld must be as nearly as possible of the same structure and composition as the rest of the strip. These requirements necessitate that the weld be formed by the metal of which the strip is composed and not by the introduction of foreign metal at the weld. The problem of welding so-called high ratio material; i. e., material having a relatively greater ratio of width to thickness, is complicated by the fact that when the metal is heated to welding temperature, it is very likely to burn. This is particularly true with electric welding where a non-uniform distribution of current will produce a much higher rate of heating at some places than others. Various factors enter into the problem of securing an even current distribution and the securing of sufficiently uniform heating conditions across the width of the strip. Not only must there be sufficiently uniform heating conditions across the width of the strip, but the sheets must be kept in alignment both laterally and in the direction of the thickness of the strip material.

According to the present invention, the joining of adjacent strip ends is effected by flash welding. In order to properly effect the flash welding of thin material, the present invention provides for the shaping of the strip ends to be joined and the accurate initial positioning of them with reference to each other. It further provides for the clamping of the sheet ends before they are welded to prevent any displacement of either of the strips after being initially positioned and to effect the movement of the ends together in the proper manner to accomplish the step of welding. The clamping means is also constructed to assure a uniform distribution of current across the width of the sheets at the time of welding.

I have also found that it is important, if uniform successive welds are to be obtained, that the grippers which hold the work pieces be kept free from accumulations of weld metal. In the flash welding process so-called "spittings" of molten metal are thrown out and they freeze or cling to the adjacent mechanism. These accumulated spittings interfere with the proper gripping of subsequent work pieces and with the supply of welding current thereto. The present invention eliminates these difficulties.

After the weld has been made, the joint has to be trimmed down to approximately the original thickness of the strip metal. The trimming of the weld removes all burnt metal from the joint leaving only a clean metal in the weld and reduces the thickness of the joint to the extent necessary to allow for its passage through a cold mill. According to the present invention a trimmer for effecting the trimming of the weld is arranged to operate upon the welded strip immediately after the joint has been made.

The foregoing advantages have been demonstrated in actual use. Additional advantages are that the apparatus is long lived, that parts which would ordinarily be expected to require frequent replacements function for extended periods of time without appreciable wear and without deterioration in the quality of the welds, that the welding may be accomplished at relatively low cost, and that the machine may be operated by workmen of only average skill and at relatively high speeds.

In the accompanying drawings illustrating a present preferred embodiment of the invention, Figure 1 is a schematic layout showing my improved welder incorporated into a train of strip handling equipment;

Figure 2 is a longitudinal vertical section through the welding unit itself, taken on the line II of Figure 4.

Figure 3 is a side elevation of the unit shown in Figure 2;

Figure 4 is a top plan view of the unit shown in Figure 3;

Figure 5 is a front end elevation of the unit shown in Figure 3;

Figure 6 is a horizontal section through Figure 5 at different elevations, the view being substantially in the plane of line VI—VI of Figure 5;

Figure 7 is a detailed view of the transformer mounting;

Figure 8 is a fragmentary view being transverse in substantially the plane VIII—VIII of Figure 3;

Figure 9 is a staggered section in substantially the plane of line IX—IX of Figure 4;

Figure 10 is a detailed view showing the gauger and the electrodes for engaging the strip, the view being a transverse vertical longitudinal section through the machine just illustrated;

Figure 12 is a top plan view of the guidetable for directing the strip material into the shear;

Figure 13 is a transverse vertical section in the plane of line XIII—XIII of Figure 12;

Figure 14 is a view partly in section and partly in elevation of the trimmer;

Figure 15 is a top view of the trimmer, parts of the structure, however, being broken away;

Figure 16 is a transverse vertical section through the trimmer;

Figure 17 is a detailed view of the cutter at the extreme nose of the trimmer, the view being a fragmentary section; and Figure 18 is a side elevation of the cam used in the welding machine.

Figure 1:
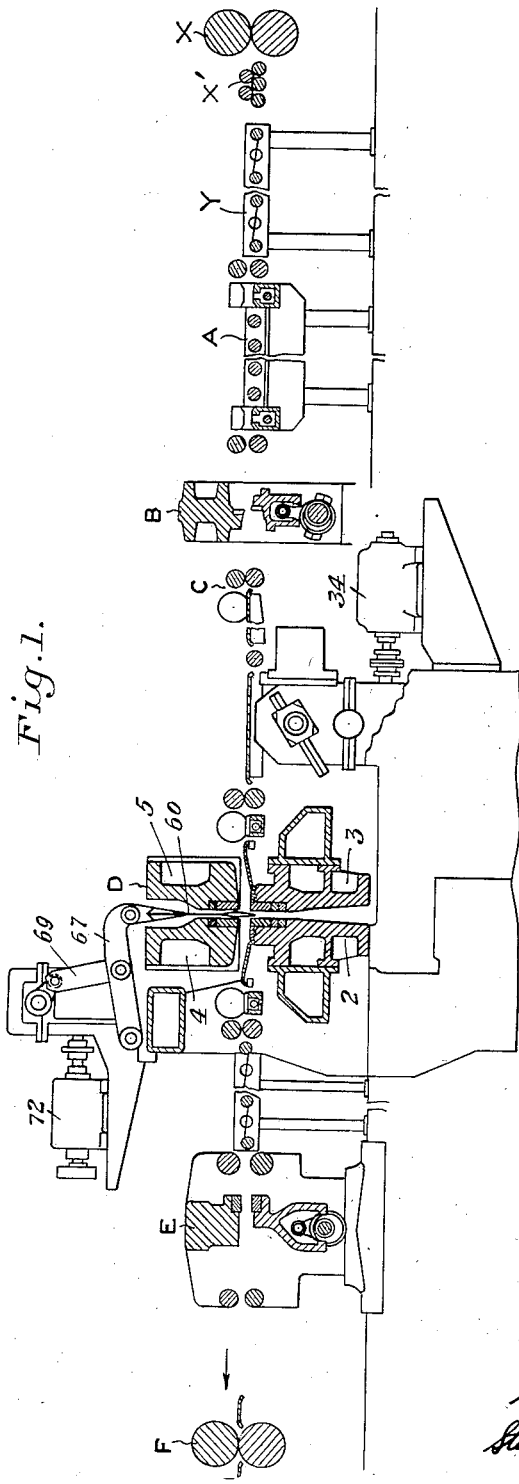

*General organization of the machine.*—Figure 1 of the drawings shows the general relationship of the several elements making up the complete welder. The hot rolled strips are fed by a pair of feed rolls X through leveler rolls X' and over a supporting table Y to a guide-table unit A. From the guide-table unit A they pass successively through a shear B, thence over a feeding and supporting table C to the welding unit D. After welding the strip material passes through a trimmer E and thence through a pair of reversible pinch rolls F to a succeeding operation, e. g., pickling or coiling.

The shear B functions to cut the ends of successive coils to form cooperating end faces which will be welded together in the unit D. The guide table A functions to present the strips to the shear B in proper position for cutting. The table C functions to support the strip and guide its edges so as to direct successive strips accurately into the welding unit D.

The welding unit D functions to engage the adjacent ends of the two coils to be welded, clamp them in the proper cooperative relationship and bring about a weld between the ends while so clamped.

The trimmer unit E functions to remove excess metal from the weld, both at the top and the bottom.

The pinch rolls F serve to pull the strips through the apparatus and also to feed the trailing end of a strip in the reverse direction back into the welding unit D so that the trailing end of the last welded coil may be brought into proper relation to the leading end of the succeeding coil.

The control mechanisms for numerous of the units, as, for example, the rolls X, X' and F are well known and will require no description here.

*The welding unit.*—See particularly Figures 2 to 11 inclusive. Generally speaking, the welding unit D comprises two pairs of clamping members or jaws which grip the adjacent ends of the strips to be welded, the pairs of jaws being relatively movable so that the movement of the strip ends necessary for welding can be effected. The welding current is supplied through the jaws. Also associated with the jaws is a gauging device for the relative positioning of the strip ends prior to welding. This permits of readily carrying out the progressive flash heating and welding which I have found is so desirable in the welding of thin strip or sheet-like material.

The general arrangement of the clamping members or jaws is illustrated in Fig. 2. There are two lower jaw members numbered 2 and 3, and two upper jaw members numbered 4 and 5. The jaw 2 is fixed. The jaw 4 is vertically reciprocable and cooperates with the jaw 2 to clamp the trailing end of a strip to be welded. The jaw 5 is vertically movable and cooperates with the jaw 3 to clamp the leading end of a strip to be welded to the strip which is clamped between the jaws 2 and 4. The jaws 3 and 5 are so mounted that they can be moved as a unit toward or away from the jaws 2 and 4.

The jaw 2 is carried between standards 6 which are carried on side frames 7. The side frames are connected together by a yoke 8 (Fig. 4) and by a transformer base 9 (Fig. 3). The standards 6 are bolted to the side frames 7 by bolts 10 which are insulated from the side frames. Strips 10' of insulation are interposed between the standards 6 and the side frames 7, these electrically insulating the standards 6 from the main frame of the machine.

The jaws 4 and 5 are so arranged that they will be moved up and down together. The mechanism for actuating the clamps is best illustrated in Figs. 2, 8 and 9. As there shown, the jaw 4 (see Fig. 9) is provided at one end with a cylindrical chamber 11 containing the upper end of a pulldown rod 12. The diameter of the chamber 11 is reduced at the upper end so as to form a shoulder which sets on top of the body portion of the pulldown rod 12. The rod 12 is provided with an extension 13 projecting beyond the upper surface of the jaw 4 and carrying a spring plate 14. Compression springs 15 are interposed between the top of the jaw 4 and the spring plate 14.

The pulldown rods 12 extend downwardly through guideways 16 in the standards 6 and carry at their lower ends links 17. These links are built-up structures having insulation 17' so that the lower ends of the links are electrically separate from the upper ends.

Actuation of the links 17 serves to raise or lower the pulldown rods 12, thereby raising or lowering the clamping jaw 4. A similar mechanism is provided for raising or lowering the clamping jaw 5. This is shown at the lefthand side of Fig. 9 and consists of pulldown rods 22 extending into recesses 23 in the jaw member 5 and having extensions 22a carrying spring plates 22b to permit of the interposition of springs 22c similar to the springs 15. The rods 22 extend downwardly through guideways in the lower jaw member 3 and are provided at their lowermost ends with links 24.

The mechanism for moving the jaws 3 and 5 toward or away from the jaws 2 and 4 is described in detail below. It should be noted at this point, however, that the desired relative movement is accomplished by mounting the jaw 3 (together with the pull rods 22, upper jaw 5 and associated mechanism) on longitudinally extending slide bars 20 at each side of the machine (Fig.

3). These slide bars are mounted in slide bearings 18 and 19 carried, respectively, by the standards 6 and the side frames 7.

The mechanism for actuating the jaws 4 and 5 is best illustrated in Fig. 2. It is so designed that the slides 20 may be moved back and forth so as to effect relative movement between the two sets of clamping jaws without disturbing the action of the jaw opening and closing mechanism.

As shown in Fig. 2, the links 17 and 24 are interconnected by a jaw actuating mechanism. The links 17 are connected to levers 25 by pins 25b. The levers 25 are rockable on a shaft 25c. They are connected at their outer ends to vertically extending links 26 through pins 26a. The links 26 are in turn connected to the outer ends of levers 27 through pins 27a. The levers 27 are connected to the lower ends of the links 24 through pins 24a. The levers 27 are secured to a rock shaft 28. The rocking of the shaft 28 is effected by a lever 29 which is keyed to the shaft and is connected through a link 30 to a crank 31. Rotation of the crank 31 through 180° from the position shown will result in rocking the lever 27 to its lowermost position. When this movement takes place, the links 24, and consequently the pulldown rods 22, are pulled downwardly bringing the jaws 5 and 3 together. Overtravel is taken up by compression of the springs 22c. At the same time the levers 27 act through the links 26 to pull the levers 25 downwardly. This results in the links 17 and the rods 12 being pulled downwardly, thus bringing the jaws 4 and 2 together, overtravel being taken care of by the compression of the springs 15.

When the lever 27 is rocked from the lowermost position just described back to the position illustrated in Fig. 2, the rods 12 and 22 will be positively moved upwardly. In the first part of the movement the springs 15 and 22c will re-expand until the upper ends of the rods engage the shouldered upper ends of the chambers 11 and 23. Further upward movement of the rods will cause the upper jaws 5 and 4 to be positively lifted.

It will be observed from the foregoing description that the jaws 4 and 5 are simultaneously actuated upwardly or downwardly as desired, and furthermore, that the jaws 3 and 5 may be moved toward or away from the jaws 2 and 4 without affecting the clamping action. The links 24 are substantially vertical and are of such length relative to the requisite amount of horizontal movement of the jaws 3 and 5 that such movement does not affect the clamping action. While a very slight upward or downward movement of the rods 22 will result theoretically from horizontal movement of the jaws 3 and 5, it is trivial in amount and is entirely absorbed by the action of the springs 22c.

The mechanism for actuating the crank 31, by whose rotation the jaws 4 and 5 are raised and lowered, is best shown in Figs. 2 and 8. As shown in Fig. 8, there are two cranks 31, one being located at each end of a shaft 31a. The shaft 31a carries a worm gear 32 meshing with a worm 33 on the shaft of a motor 34. The crank pin of one of the cranks 31 carries an arm 35 of a limit switch 36 so arranged as to stop the motor 34 when the crank 27 is in the position of Fig. 2 or in its lowermost position corresponding to a throw of 180° of the cranks 31 from the positon shown in Fig. 2. It is unnecessary to provide for any intermittent stoppages of the motor 34 because the springs 15 and 22c provide a sufficient amount of take-up to compensate for the different gauges of strip encountered in commercial use of the welder. Within reasonable limits any desired strip gauges may be fed into the welder and automatically clamped therein without any adjustment of the clamping mechanism whatever.

Figure 11:
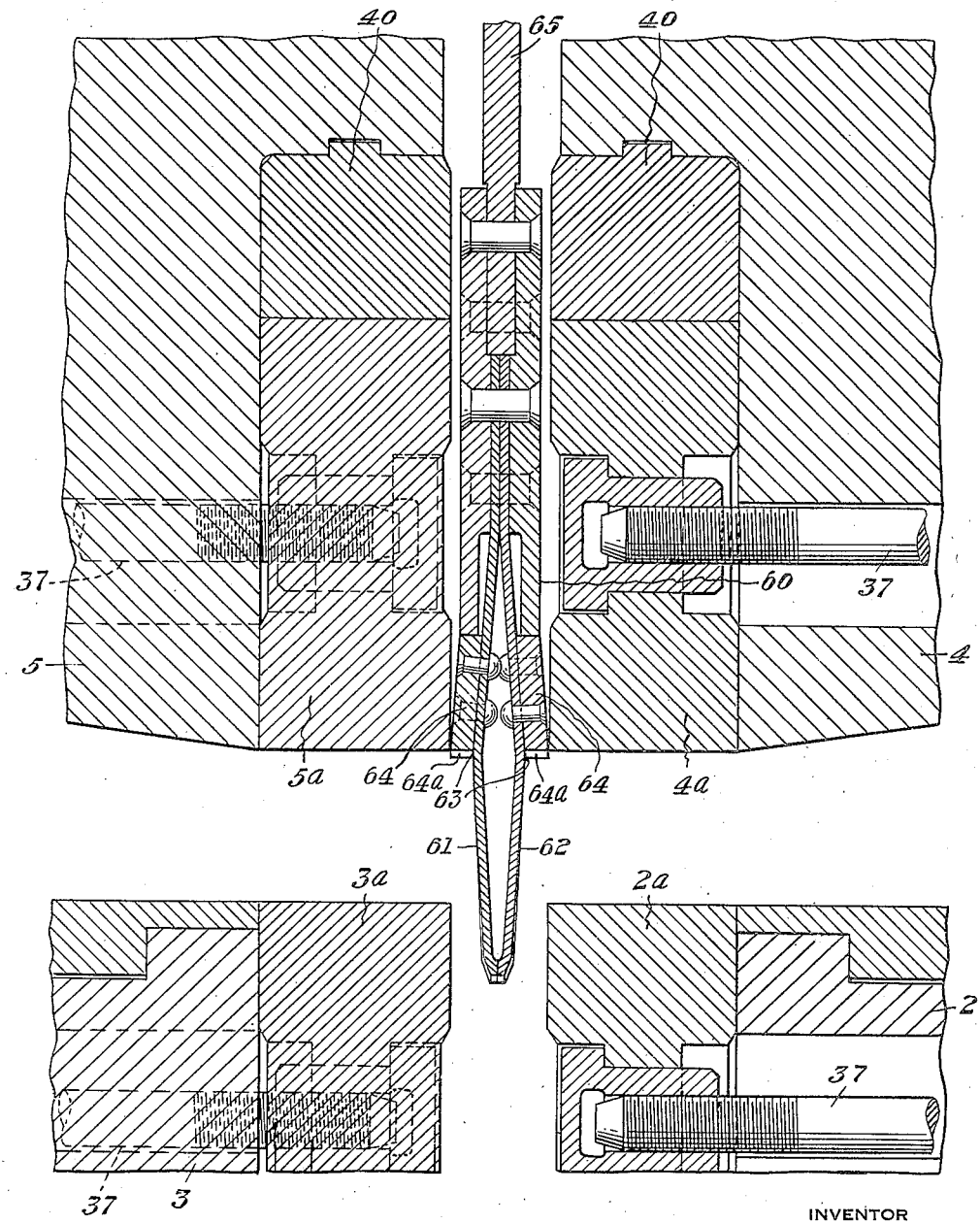
Figure 11 is a view similar to Figure 10 but on a larger scale showing the gauger in section and showing the clamping dies with which the gauger cooperates also in section.

The clamping jaws 2, 3, 4, and 5 are provided with clamping dies 2a, 3a, 4a, and 5a respectively (Figs. 10 and 11). These clamping dies which are mounted in the corner edges of the supporting jaws on which they are mounted are held in place by bolts 37 which pass through slots in the jaws so that the dies may have a limited range of adjustment with respect to the jaws on which they are mounted. The dies apply the clamping pressure to the strip material and the electric current also enters the strip material from these dies. It is, therefore, important that they contact the strip material with uniform pressure across the entire width of the strip.

The lower dies 2a and 3a are adjustable up and down by means of wedges 38 (Figs. 10 and 11). Under the wedges 38 are wedge shaped cambering bars 39. As will be seen by reference to Fig. 9, the top surface of the cambering bars 39 is very slightly convex so that the two ends of the cambering bars normally curve downwardly away from the ends of the wedges 38. This curvature which is very much exaggerated in Fig. 9, compensates for the deflection which inevitably occurs when the upper jaw members are pulled down into clamping engagement with the strip. Without having a slight camber on the surface of the members 39 the clamping dies would tend to press or clamp the strip material more firmly adjacent the edges than at the center, but through the provision of the camber there can be enough spring or resilience to the lower dies to compensate for deflection and cause the pressure to be applied uniformly across the width of the strip material. The amount of camber in the bars 39 will vary according to the design and construction of the welding machine. In the particular machine illustrated in the drawings I have found that a camber of .0025" per foot of width of the strip is satisfactory.

In back of the upper dies 4a and 5a there are wedges 40 for backing up the die blocks, but it is unnecessary to employ any cambering bars back of the upper dies.

By backing up all of the dies 2a, 3a, 4a, and 5a with wedges, the working faces of the dies can be set at the exact level desired and the adjustment can be changed from time to time to take care of wear or for any other reason requiring the adjusting of the dies. It is found in practice that the wear of the dies is very slight and that in consequence the high quality of the welds is maintained. There is, however, some tendency of the four dies to wear, especially at their innermost corners, and compensation for this can readily be made by the mechanism above described. It will also be noted that the several dies are symmetrical about their vertical and horizontal axes and hence may be placed in the machine so that any of their end corners is nearest the point of weld thus enabling the dies to be turned from time to time to present different corners and faces at the point of weld.

Figs. 7 and 9 show the transformers which supply the welding current. While any number of transformers may be used, I have found, especially in the welding of broad strip, that it is desirable to employ more than one transformer in order to get a more uniform distribution of current crosswise of the strip to be welded. I have used two transformers in a machine for the welding of strip 90″ wide, with entire satisfaction. The transformers designated 44 in the drawings are auto transformers of the character generally used in flash welding with a number of taps so that the welding current can be very closely adjusted with respect to the thickness and width of the strip and with respect to certain variable characteristics of the welding apparatus. As shown at 45 in Fig. 7, one side of the secondary of each transformer is directly connected to the clamping jaw 2. The other side of the secondary is connected through flexible laminated copper leads 46 to the lower clamping jaw 3. This arrangement permits of the jaw 3 being moved toward or away from the jaw 2 without interruption of the circuit.

The insulation of the several parts of the machine one from the other has been referred to above. It should also be noted that insulating liners 41 and 42 (Fig. 9) are provided within housings 18 for the ends of the slide bars 20, thereby insulating the jaws 3 and 5, with their attendant mechanism, from the jaws 2 and 4.

In the flash welding process, as ordinarily carried out, the pieces to be welded are momentarily brought into contact so as to establish the flow of current across the joint. They are then pulled apart slightly so as to draw an arc. As the current continues to flow across this arc, the adjacent metal becomes intensely hot and is partly burned or flashed away. When the metal is heated up to the desired temperature, the two pieces are forced together, thus bringing about a weld, the excess metal being upset. The welding current is, of course, cut off at an appropriate moment in the cycle.

I have found that this procedure is inferior for the welding of wide thin strip because the heating is frequently non-uniform and, in consequence, the welding is non-uniform and in some cases is even discontinuous. I provide for a progressive arcing or flashing of the current across the joint by placing the edges to be joined very slightly out of parallelism with one another. In consequence, when the two strips to be welded are moved toward one another with the welded current on, the arc is first established at one side of the strips. The arc advances progressively and rapidly across the whole width of the strips. As soon as the arc is established over the entire width of the strips, the heating is continuous and uniform over the entire length of the joint, and in consequence a uniform uninterrupted weld of high quality results.

The mechanism for effecting the movement of the jaws toward and away from one another is best shown in Figs. 2, 4, 6 and 8. At each side of the machine there is a pullback cylinder 47 (Fig. 4) having a piston 48 attached to a slide bar 20 (Fig. 6). These cylinders are under constant fluid pressure at the end adjacent the weld line so as to exert a constant force tending to pull the jaws apart. The jaws are thus biased to an open position but the arrangement permits of them being moved toward one another in any desired amount against the yielding resistance of the fluid in the cylinders 47.

The jaws 3 and 5 are moved toward the jaws 2 and 4 by a motor 50 connected to a cam shaft 51 through reducing gearing 52 (Fig. 8).

At each end of the cam shaft 51 there is a cam 53 which is shown in detail in Figure 18. The cams 53 bear against follower rolls 54 on brackets 55 adjustably carried in the lower jaws 3. The brackets 55 may be adjusted on the jaw 3 by means of adjusting screws 55a. A limit switch 56 (Fig. 8) is connected to the reducing gearing 52 by a shaft extension 57 which controls the motor 50 so that when actuated it rotates the cam 53 through a single revolution corresponding to one welding cycle, and then stops.

Fig. 18 shows one of the cams 53 in detail. These cams are very accurately made because reliance is placed upon them to advance the metal at the correct rate for welding. At the commencement of the welding operation each roller 54 engages the portion 53a of its corresponding cam. The portion 53a increases in radius very slightly until an insert 53b is reached. This insert gives a relatively quick forward movement to the jaws 3 and 5 and establishes the initial contact between the strips. This establishes the circuit. As the insert 53b passes out of contact with the rolls 54, and the rolls 54 contact portion of surface 53c, there is a slight movement of the jaws 3 and 5 away from the jaws 2 and 4, thus drawing the arc. Due to the limited area of initial contact and the consequent high concentration of current thereat, only a very slight separation is necessary. The next portion 53d of the cam 53 has a slow rise which serves to keep the edges at the right spacing as the metal burns back. There follows an insert 53e which provides a quick cam rise functioning to move the now heated edges of the strip into engagement and upset the metal and form the weld.

The insert 53b and 53e are interchangeable with other inserts of like character so that the proper rate of movement and the proper retraction of the jaws to form the arc, for different gauges of strip, may be had. The motor 50 is an adjustable speed motor so that the total time required for the cycle may be adjusted.

It will be evident from the foregoing that the initial positioning of the strip ends, prior to clamping, is of importance in practicing my invention. I insure the proper positioning of the strip ends and at the same time attain other important advantages hereinafter mentioned by the provision of a gauger which may be lowered into the space between the jaws 2, 4 and 3, 5. The general arrangement and location of the gauger in respect of the other portions of the machine is best illustrated in Figs. 1 and 5. The construction is shown in detail in Figs. 10 and 11.

The gauger is designated generally by the reference character 60. It comprises two metal sheets secured together in face-to-face relation. They are bulged outwardly as indicated at 63, and then tapered toward one another so as to form a generally wedge-like body. The plates 61 and 62 are slightly resilient. Each of them carries a blade 64 whose lower most edge 64a terminates at the widest portion of the wedge-like portion of the gauger.

The gauger has a pair of spaced arms 65 (Fig. 5) which are pivotally connected at 66 to arms 67 (Fig. 10). The arms are pivotally mounted on a cross frame 74 as indicated at 68. The gauger is raised and lowered and, at the same time, moved sidewise by raising and lowering the arms 67. The raising and lowering of the arms is effected by links 69 connecting the arms 67 with cranks 70 on a shaft 71. The shaft 71 is connected through reducing gears (not shown) to a driving motor 72. The shaft and the motor are mounted on a support 73 carried by the cross frame 74.

In the position shown in solid lines in Figs. 10 and 11, the gauger functions to locate the opposed ends of the strips to be welded in accurate initial relation to one another. The trailing end of the strip which is engaged by the pinch rolls F is moved into contact with the gauger by a reverse operation of the pinch rolls. The leading end of the oncoming strip is brought into contact with the opposite side of the gauger by operating pinch rolls X. The clamping jaws are closed on the strips while they are thus positioned by the gauger.

As above stated, it is desirable to position the edges which are to be welded out of parallelism with one another so that the strips make initial contact at one end of the weld line. This is accomplished by constructing the gauger so that when it is in the position of Fig. 11 it is thicker in cross section, at a plane drawn through the top surfaces of the dies 2a and 3a, at one side than at the other. This may be done by so forming the gauger that the angularity of the portions 61 and 62 varies from end to end, but the same result can be more simply brought about by merely tilting the gauger slightly. This is done by making one of the arms 65 a little longer than the other so that the gauger is inclined at a slight angle to the horizontal. This is shown in Fig. 11.

I have found in practice that the adjacent ends to be welded need be only slightly out of parallelism. I have successfully operated with the gauger so positioned as to render the adjacent ends approximately $3/32''$ out of parallelism in a width of 90''.

As hereinafter pointed out, the ends to be welded may or may not be sheared at an angle corresponding to the desired angularity at initial contact. Generally speaking, it is more convenient to cut the ends square. This necessarily means that a slight buckle must be thrown into the strip in order to place the two squared ends in the desired non-parallel relationship. The formation of the buckle is facilitated by locating the plane of welding out of the normal plane of travel of the strip, preferably below it. This is well illustrated in Fig. 10 of the drawings where the dies 2a and 3a are shown below the level of the supporting rollers for the strip.

A seeming objection to the method of welding herein disclosed is that the strips are not welded in exact alignment with one another but at a slight angle. I have discovered, however, that the angular relationship of the strip portions one to another does not interfere with subsequent operations, such as cold rolling or pickling. In either case the strip may be fed through the cold mill or the pickling train without any adverse effects. In certain cases it may be desirable to eliminate this slight misalignment, although, as stated, it is not a serious factor in commercial operations as now practiced. If it should be desired to align the strips exactly, this can be done either by shearing one or both of the ends to be joined at a slight angle or by making the cam inserts 53e (Fig. 18) of slightly different height so as to provide a greater push-up on one side of the machine than on the other.

After the strips have been clamped with their ends abutting the gauger, it is necessary to remove the gauger from the welding zone. This is done by raising the arms 67 to the position shown by dot-and-dash lines in Fig. 10. The jaw 4 is provided with a recessed portion 75 and on the upward movement of the arms 67 the gauger is lifted and at the same time moved sidewise so that it lies in this recess. The jaw 4 has a sloping face 76 before the recess 75 so that upon downward movement of the arms 67 the gauger will travel smoothly into the space between the jaws 4 and 5.

During the flash welding operation a substantial amount of metal "spittings" is thrown off. When the gauger is raised to the position shown in dot-and-dash lines in Fig. 10, it is out of the path of the spittings so that there is no chance for them to accumulate on it and impair its accuracy.

The spittings tend to collect on both the upper and the lower dies and the gauger functions in its downward travel to remove them. This is a feature of material importance for it keeps the dies clean and insures that the welding operation will be properly carried out. The blades 64 act as scrapers which remove the spittings from the dies. In order to remove the spittings from the lower dies it is necessary to move the gauger to a position below that shown in solid lines in Figs. 10 and 11. The lowermost position, which is effective for cleaning of the lower dies, is illustrated in dotted lines in Fig. 10. It should be noted that the tilting of the gauger as above described results in one end of each blade 64 being a little lower than the opposite end. This facilitates entry of the gauger between the lower dies 2a and 3a. It likewise makes the shearing action of the blades 64 more effective since the shearing off of the spittings is carried out in a progressive manner.

Figs. 2 and 10 show another feature of my invention which is of importance in obtaining satisfactory welding and long-continued operation of the machine. Since the metal strips are relatively thin and since offsetting of the strips at the joint must be avoided, it is necessary to clamp the strips firmly and at points quite near the engaging edges. This necessarily requires that the clamping dies be located to one side of their respective jaws, and there is a resulting tendency for the jaws to be forced out of vertical alignment when the full clamping pressure is applied. Unless resisted, this would result in faulty clamping and ultimately in inferior welding. The alignment is preserved by means of adjustable wedges 80 and 85. The wedges 80 are interposed between the jaw 4 and the standards 6 and lie against inclined surfaces 82. They are vertically adjustable by means of screws 83. The jaw 4 carries bearing plates 81 which bear against the adjacent surfaces of the wedges 80. This construction permits of the jaw 4 being moved up and down as required for clamping, all slackness or play, however, being eliminated by proper adjustment of the wedges 80. The wedges 85 perform a similar function for the jaw 5. They are mounted in standards 84 secured to the slide bars 20 and lie between inclined surfaces 86 on such standards and bearing plates 87 on the jaw 5. The vertical position of the wedges 85 is adjusted by means of bolts 88.

Rollers at 90, 91 and 92 and aprons at 93, 94 and 95 serve to guide the strip ends properly into the space between the welding dies. In order to accurately align the strips in end-to-end relation there are edge engaging disks at 96, 97 and 98. These disks may be adjusted crosswise of the machine through screws 99 which may be either motor or hand operated.

By way of recapitulation, a cycle in the operation of the welding machine will now be described: Assuming the jaws 4 and 5 to be in their uppermost position, the jaws 3 and 5 being retracted from the jaws 2 and 4, and the gauger being in its uppermost position, a coil of strip is run through the machine until its trailing end lines between the blades of the shear B. The tail is cut off and the strip is advanced by the feed rollers beyond the welding zone. The gauger is then lowered and the pinch rolls F are operated in the reverse direction to thrust the end of the strip firmly against the gauger. A second strip is fed into the machine and the leading end is sheared in the shear B. It is fed forward until the leading end engages firmly with the gauger. By reason of the tilting of the gauger, a slight buckle is thrown into each strip and the adjacent ends thus positioned out of parallelism with one another in the desired amount. The motor 34 is then actuated to clamp the strip ends and the gauger is raised. The motor 50 is then operated to rotate the cam shaft 51 and advance the strip ends toward one another. Just before they come together, the welding current circuit is closed by the operation of the switch 56. Initial contact between the strips is made at one end of the joint and flashing is there initiated. The flashing progresses rapidly across the entire width of the joint as the strip ends move together, excess metal being burned away and the edges being brought up to the proper welding temperature. The cam portions 53e then bring about the pushup which completes the weld. At this time the welding current is interrupted by the operation of the switch 56 and the motor 50 is brought to rest after the cam inserts 53e have turned past the point of contact with the rollers 54. This leaves the jaws 3 and 5 free to move away from the jaws 2 and 4 under the bias of the cylinders 47, but such retraction is prevented by reason of the clamping action of the jaws on the metal. The motor 34 is actuated to open the jaws, whereupon the slides 20 carrying the jaws 3 and 5 are retracted.

*The guide table.*—The guide table A, which is shown in detail in Figs. 12 and 13, functions to align the strips accurately for presentation to the shear. It comprises a stand 110 having a bed 111 above which are conveying rollers 112. Between the rollers there are aprons 113. At each end of the table is a pair of rolls 114 between which the strip material passes. Extending across the bed of the table adjacent each end and below the level of the rollers 112 are transversely extending shafts 115 and 116. Shaft 115 is adjacent the receiving end of the table and shaft 116 is adjacent the discharge end of the table. They are of substantially similar construction, being provided with reversely threaded portions 115a and 115b and 116a and 116b respectively. These shafts 115 and 116 are set in guideways. On each of the threaded portions of the shafts is a nut 117. These nuts in turn are attached to blocks 118 all of similar construction having sheet edge engaging guide portions 119. These portions 119 flare upwardly toward the longitudinal center line of the machine. The guide blocks are so positioned and constructed that the two of them on the shaft 115 and the two of them on the shaft 116 may be moved toward and away from each other by rotation of the shafts 115 and 116 resectively. When moving inward they will engage the edges of a strip resting on the table. The blocks may be all symmetrically positioned with respect to the center line of the table or the center line of the entire pickling train, and when they move inward in the manner described, they serve to center the strip on the table. The shafts 115 and 116 are driven by a motor 120 through gearing in housings 121 and 122. A limit switch 123 is provided for normally limiting the rotation of the shafts 115 and 116 to a single turn, as this will normally be sufficient for centering strips or coils of a given width. The table is adjustable for taking care of strips of various widths by setting the blocks 118 closer to or further from the center line.

The construction of the guide table as so far described is such that the strips will be presented squarely to the shear so as to obtain a cut at a true right angle to the length of the strip. If desired, however, the blocks 118 on the shaft 115 may be set slightly out of alignment from the blocks 118 on the shaft 116. If this is done the strip will be pulled around so that its center line is at a slight angle to the center line of the feed table, thus causing shearing at a slight angle.

*The flash trimmer.*—After the weld has been made and the metal freed from the grip of the clamping jaws, the pinch rolls F are operated to pull the strip through the flash trimmer E, which functions to remove excess metal. The flash trimmer is shown in detail in Figs. 14, 15, 16, and 17. This flash trimmer constitutes the subject of my copending application Serial No. 215,387, filed June 23, 1938. It comprises a base 130 having integral guide posts 131 thereon. There is a top knife holder 132 and a bottom knife carrying ram 133. The knives in both the top holder and the bottom ram, all designated 134 (see Figures 15 and 17) are so shaped that four cutting edges are selectively available. They are removably held in place by bolts 135. As shown in the drawings, the knives are arranged so as to form a V which points in the direction of the welding unit. In many cases, however, it may be desirable simply to use blades the full width of the strip and incline them at a suitable angle to the direction of travel as specifically shown and described in my said copending application. If the knives are arranged in the form of a V, a pointed insert or tip 136 is held in position at the convergence of the knives 134 by a bolt 137. This tip serves to initiate the trimming cut.

Spools 138 keep the center knives positioned (see Fig. 16). The trimming knives 134, in addition to being held in place by bolts 135, are kept in position by tongues 139 and 140 which enter grooves in the knives as clearly shown in Figure 17. By reason of this arrangement, the alignment is maintained irrespective of any dressing of the cutting edges of the knives from time to time.

In order to bring the knives into cutting position, there is provided a motor 141 which drives a crank shaft 142 through a reduction gear 143. Pitmans 144 engage cams or cranks 145 on the shaft 142. The bottom knife carrying ram is guided in the top knife carrier by means of upwardly projecting extensions 146, the top knife carrier being guided on the posts 131 on the base. The vertical stroke of the bottom knife ram is somewhat in excess of the distance which initially separates the top and bottom knives, and in operation the bottom knife ram will, near the upper limit of its travel, raise the top knife holder off the base a short distance. The final clearance between the knives, which is only very slightly more than the thickness of the strip, is established by the engagement of rollers 147 and 148 with the strip. The top knife holder is made of massive construction so that its weight is greater than the cutting thrust in order that after the clearance has been established by the engagement of the rollers 147 and 148 with the strip, the knives will not spread or open during the cutting operation. The rollers 147 and 148 arc adjustable by means of wedges 149 (see Figure 14) and adjusting screws 150. Adjustment of these rollers moves them with relation to the knives for establishing the amount of clearance of the knives above the surface of the strip in cutting. At the rear of the upper knife holder is a roller 151 which is also adjustable by means of a wedge 152 and bolts 153. At the rear of the lower knife carrying ram there is a roller 154 which is spring loaded through springs at 155. Clearance between the knives is established by rollers 147 and 148 only.

A cycle of operation of the flash trimmer is as follows: The welded strip is run past rollers 147 and 148 through the operation of the pinch rolls F. The motor 141 is then started and after the crank shaft 142 has rotated 180° of travel, the motor 141 is stopped. This is accomplished through the switch 156. The pinch rolls F are then again operated pulling the strip through the flash trimmer. The center knife 136 will cut through the metal protruding through the thickness of the strip and the flash trimmer knives 134 will thereafter cut off the excess metal. During the trimming operation, the weight of the upper knife carrier is transmitted through the rolls 147 to the strip and the roll 148 to the ram so that the upper knife carrier in effect is floated on the lower knife carrying ram and the weight of the upper knife carrier resists any separation of the knives. After the flash has been trimmed from the weld, the trimmer is opened by again operating the motor 141 to restore the parts to the position shown in Figure 16, and the strip can then be pulled freely through the trimmer.

While I have illustrated and described the present preferred embodiment of the invention, it will be understood, however, that this is by way of illustration only, and the invention may be otherwise embodied or practiced within the scope of the following claims.

I claim:

1. A welding machine for joining strips of sheet metal in end to end relation comprising two pairs of sheet gripping members, one of which is movable horizontally toward and away from the other, one member of each pair being movable vertically with respect to the other, said members comprising rigid carrier blocks, sheet gripping dies adjustably mounted in that corner edge of each block which is nearest the corner edge of the other three blocks, and cambering means backing up the die of one of the blocks of each pair to compensate for the deflection of the blocks and dies under pressure to thereby equalize the pressure which the dies apply to the strip material in clamping the same.

2. A welding machine for joining strips of sheet metal in end to end relation comprising two pairs of sheet gripping members, one of which is movable horizontally toward and away from the other, one member of each pair being movable vertically with respect to the other, said members comprising rigid carrier blocks, sheet gripping dies adjustably mounted in that corner edge of each block which is nearest the corner edge of the other three blocks, and adjustable wedge means backing up the movable blocks of each pair for holding them in vertical alinement.

3. A welding machine for joining strips of sheet metal in end to end relation comprising two pairs of sheet gripping members, one of which is movable horizontally toward and away from the other, one member of each pair being movable vertically with respect to the other, said members comprising rigid carrier blocks, and sheet gripping dies adjustably mounted in the corner edge of each block which is nearest the corner edge of the other three blocks, means for operating the vertically movable members into and out of sheet gripping position, and means which compensate for deflection of the sheet gripping members when gripping a sheet.

4. A machine for welding the ends of two strips together comprising a pair of strip clamping members for receiving the end of one strip, a second pair of strip clamping members opposite the first for receiving the end of the other strip, each pair of clamping members having one of its members movable relatively to the other into and out of clamping position, each pair of clamping members being adapted to engage the strip close to but back from the extreme end thereof, each member having a strip engaging element that makes contact with the face of the strip across the full width of the strip, gauging means movable into and out of position between the two pairs of members to accurately position the distance which each strip end projects beyond the pair of clamping members in which it is held, means for effecting relative movement of one pair of clamping members toward and away from the other a predetermined distance, said pairs of clamping members being electrically separate from each other, a source of welding current having one pole connected to one pair of clamping members and one pole connected to the other pair, and means for cambering one of the strip engaging elements of each pair of members to compensate for deflection when clamping pressure is applied to the members.

5. A machine for welding the ends of two strips together comprising a pair of strip clamping members for receiving the end of one strip, a second pair of strip clamping members opposite the first for receiving the end of the other strip, each pair of clamping members having one of its members movable relatively to the other into and out of clamping position, each pair of clamping members being adapted to engage the strip close to but back from the extreme end thereof, each member having a strip engaging element that makes contact with the face of the strip across the full width of the strip, gauging means movable into and out of position between the two pairs of members to accurately position the distance which each strip end projects beyond the pair of clamping members in which it is held, means for effecting relative movement of one pair of clamping members toward and away from the other a predetermined distance, said pairs of clamping members being electrically separate from each other, a source of welding current having one pole connected to one pair of clamping members and one pole connected to the other pair, means for cambering one of the strip engaging elements of each pair of members to compensate for deflection when clamping pressure is applied to the members, means for yieldably applying pressure to the movable member of each pair to move it into and hold it in clamping position, and adjustable means for bracing the movable member of each pair against tipping when clamping pressure is applied thereto.

6. A machine for welding the ends of two strips together comprising a pair of generally horizontal strip clamping members arranged one above the other for receiving the end of one strip between them, a second pair of generally horizontal strip clamping members opposite the first pair and also arranged one above the other for receiving the end of the other strip between them, each pair of clamping members having one of its members vertically movable relatively to the other into and out of clamping position, each pair of clamping members being adapted to engage the strip close to but back from the extreme end thereof, each member having a strip engaging element that makes contact with the face of the strip across the full width of the strip, gauging means vertically movable into and out of position between the two pairs of members to accurately position the distance which each strip end projects beyond the pair of clamping members in which it is held, means for effecting relative movement of one pair of clamping members toward and away from the other a predetermined distance, said pairs of clamping members being electrically separate from each other, a source of welding current having one pole connected to one pair of clamping members and one pole connected to the other pair, and means carried by the gauger and vertically movable therewith for scraping the exposed faces of both the upper and lower strip engaging elements carried by the several members to remove foreign material each time the gauger is moved into operative position.

7. A welding machine for joining one length of strip metal to another comprising a pair of gripping members for engaging one of the strip ends to be joined, a second pair of gripping members to engage the other strip end, one of the members of each pair of gripping members being movable vertically with respect to the other into and out of sheet gripping position, one pair of gripping members being movable horizontally toward and away from the other, a gauger movable between the two pairs of members when they are separated, a gauger movable vertically into and out of the space between the two pairs of gripping members when said members are separated one from the other, said gauger having scrapers thereon adapted to contact the side faces of the gripping members to remove adhesions of metal therefrom, the gauger also having a wedge portion adapted to form an abutment against which the strip ends are moved for initially determining the space between them, and means for moving the gauger through a cycle in which the gauger enters the space between the two pairs of gripping members a sufficient distance to cause the scrapers thereon to move across the faces of all of the gripping members and is then partially retracted to bring the abutment-forming portion of the gauger into the path of travel of the metal strip to be welded and for thereafter withdrawing the gauger completely from the space between the two pairs of gripping members.

8. In a welding machine of the class described, a gauge head comprising a wedge-shaped member, and scrapers along each face of the wedge-shaped member.

9. The combination with a welding machine of the class described having two pairs of gripping members, one pair being movable toward and away from the other pair, a gauger for cleaning the gripping members of adherent metal and for determining the spacing of the two strip ends to be welded in the gripping members, said gauger comprising two resilient metal plates shaped to form a wedge-shaped head, and a scraper secured to the outer face of each plate, the resilient plates serving to resiliently urge the scrapers carried thereon outwardly.

10. A welding machine for joining one end of a piece of strip metal to the end of another piece of strip metal comprising a pair of clamping members for engaging one of the strip ends to be joined, means for reciprocating one of the clamping members of said pair with respect to the other into and out of sheet clamping position, a second pair of sheet clamping members for engaging the end of the other strip to be welded, means for reciprocating one of the members of said second pair into and out of clamping relation with the other members of said pair, one of said pairs of gripping members being reciprocable horizontally toward and away from the other, each of said gripping members comprising a rigid block having an adjustable gripping die member along that corner face thereof which is nearest the corner face of the other three blocks, and means movable in a vertical direction between the two pairs of gripping members when they are separated, and adapted to engage die members successively, for scraping metallic adhesions from faces of said die members.

11. A welding machine for joining one end of a piece of strip metal to the end of another piece of strip metal comprising a pair of clamping members for engaging one of the strip ends to be joined, means for reciprocating one of the clamping members of said pair with respect to the other into and out of sheet clamping position, a second pair of sheet gripping members for engaging the end of the other strip to be welded, one of the members of said second pair being movable into and out of clamping relation with the other members of the pair, one of said pairs of gripping members being reciprocable horizontally toward and away from the other, each of said gripping members comprising a rigid block having an adjustable gripping die member along that corner face thereof which is nearest the corner face of the other three blocks, means movable vertically between the two pairs of gripping members when they are separated, and adapted for engaging die members successively, for scraping metal adhesions from faces of said die members, and a gauger carried by the scraping means adapted to form a stop against which the strip ends can be butted for initially positioning the sheet ends in the respective pairs of gripping members.

12. A welding machine for joining one end of a piece of strip metal to the end of another piece of strip metal comprising a pair of clamping members for engaging one of the strip ends to be joined, means for reciprocating one of the clamping members of said pair with respect to the other into and out of sheet clamping position, a second pair of sheet gripping members for engaging the end of the other strip to be welded, one of the members of said second pair being movable into and out of clamping relation with the other member of the pair, one of said pairs of gripping members being reciprocable horizontally toward and away from the other, each of said gripping members comprising a rigid block having an adjustable gripping die member along that corner face thereof which is nearest the corner face of the other three blocks, and means movable vertically between the two pairs of gripping members when they are separated for scraping metal adhesions from faces of said die members, and a gauger carried by the scraping means adapted to form a stop against which the strip ends can be butted for initially positioning the sheet ends in the respective pairs of gripping members, and means for operating said scraping means and gauger from a retracted position where the scraper and gauging means are clear of the clamping dies through a cycle where it effects the scraping of all of the dies and to a position where the gauger is effective to form a stop for the ends of strip positioned in the two pairs of gripping members, said operating means being operative to thereafter retract the scraper and gauging means to the initial retracted position.

13. A gauging mechanism for use in a welding mechanism of the class described comprising a pair of resilient plates shaped to form a wedge shaped terminal portion, a scraper carried on the outer face of each of said plates, links from which the assembly plates and scrapers are suspended, arms movable through a vertical arc to which said links are attached, and motor driven means for raising and lowering the arms.

LORENZ IVERSEN.